US009239822B1

(12) United States Patent
Greco et al.

(10) Patent No.: US 9,239,822 B1
(45) Date of Patent: Jan. 19, 2016

(54) INCORPORATING MEDIA OBJECTS IN YEARBOOKS

(71) Applicants: Aaron Nathaniel Greco, Belmont, CA (US); Kevin G. Zerber, Redwood City, CA (US)

(72) Inventors: Aaron Nathaniel Greco, Belmont, CA (US); Kevin G. Zerber, Redwood City, CA (US)

(73) Assignee: TreeRing Corporation, San Mateo, CA (US)

( * ) Notice: Subject to any disclaimer, the term of this patent is extended or adjusted under 35 U.S.C. 154(b) by 258 days.

(21) Appl. No.: 13/830,769

(22) Filed: Mar. 14, 2013

(51) Int. Cl.
*G06F 17/22* (2006.01)
*G06F 17/24* (2006.01)
*G06F 17/21* (2006.01)
*G06Q 30/02* (2012.01)
*G06T 11/60* (2006.01)

(52) U.S. Cl.
CPC .............. *G06F 17/24* (2013.01); *G06F 17/211* (2013.01); *G06Q 30/0273* (2013.01); *G06T 11/60* (2013.01)

(58) Field of Classification Search
None
See application file for complete search history.

(56) References Cited

U.S. PATENT DOCUMENTS

| 8,214,426 | B2* | 7/2012 | Olson et al. | 709/203 |
| 8,244,801 | B2* | 8/2012 | Olson et al. | 709/203 |
| 8,595,294 | B2* | 11/2013 | Olson et al. | 709/203 |
| 2006/0129924 | A1* | 6/2006 | Nelson et al. | 715/530 |
| 2010/0070572 | A1* | 3/2010 | Olson et al. | 709/203 |
| 2010/0229085 | A1* | 9/2010 | Nelson et al. | 715/255 |
| 2012/0328168 | A1* | 12/2012 | Dailey et al. | 382/118 |
| 2012/0328169 | A1* | 12/2012 | Heeter et al. | 382/118 |
| 2013/0103506 | A1* | 4/2013 | Olson et al. | 705/14.69 |
| 2013/0262564 | A1* | 10/2013 | Wall et al. | 709/203 |

* cited by examiner

*Primary Examiner* — Maikhanh Nguyen
(74) *Attorney, Agent, or Firm* — Fenwick & West LLP (57) ABSTRACT

A yearbook customization system maintains customizable yearbooks for students and allows students to include media objects in printed copies of customizable yearbooks. The customizable yearbook includes a video presentation page with an attached video presentation device. A student may customize the layout of the video presentation page. The yearbook customization system suggests media objects for inclusion in the printed yearbook. The media objects are selected for suggestion based on various criteria including the time of capture or the media object, an association of the media object with a school event, and so on. The information describing the videos to be included in the yearbook and the layout of the video presentation page is stored as information of the customizable yearbook and sent for generation of printed yearbooks.

18 Claims, 9 Drawing Sheets

INCORPORATING MEDIA OBJECTS IN YEARBOOKS

FIELD OF THE INVENTION

This invention relates to student yearbooks in general, and more specifically to incorporating media objects in customizable yearbooks.

BACKGROUND

A yearbook is a book that records events related to an educational organization that is typically published annually. Yearbooks are published by elementary schools, middle schools, high schools as well as colleges. A yearbook may cover the entire school with sections for different grades. Yearbooks typically cover a wide variety of topics including academics, student life, sports, and various school events.

Yearbooks form a significant item that students like to keep for a long time after they graduate. Students take pride in seeing their pictures and other information in the yearbook and sharing their yearbooks with others. People often look at their yearbooks several years after they graduate to remind themselves of their school memories and to share their memories with others. People look at their yearbooks to remember their friends and teachers, remember what their friends and others wore in school days, remember old relationships between students in school days, and so on.

Since yearbooks form an important item in the life of people, it is important for a yearbook to provide an interesting reader experience. An interesting experience with yearbooks is likely to increase student interest in yearbooks. This promotes the business of vendors providing yearbooks. Furthermore, students acquire a valuable and interesting item that lasts a long time in their life.

SUMMARY

The above and other issues are addressed by a computer-implemented method, computer system, and computer program product for allowing students to customize yearbooks by including media objects in a printed yearbook. A yearbook customization system maintains customizable yearbooks for students. A customizable yearbook includes a portion of the yearbook customizable by students. The yearbook customization system receives one or more videos for including in a printed copy of a customizable yearbook of a student. The yearbook customization system also receives information describing a video presentation page of the customizable yearbook. The video presentation page includes a portion for presenting information describing videos and a portion for attaching a video presentation device for presenting the videos. The information describing the one or more videos and the layout of the video presentation page is stored as information of the customizable yearbook and sent for generation of printed yearbooks. The printed yearbook includes the video presentation device attached to the video presentation page.

In an embodiment, the yearbook customization system suggests media objects to students for including in the yearbook. The media objects may be videos uploaded by the student, videos sent to the student by other students, or slide shows of images associated with the student. The yearbook customization system ranks the suggestions based on various factors including association of the videos with school events, time of capture of the video and so on, if the video was sent by another student, the relationship between the recipient and sender of the video.

The features and advantages described in this summary and the following detailed description are not all-inclusive. Many additional features and advantages will be apparent to one of ordinary skill in the art in view of the drawings, specification, and claims.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

DETAILED DESCRIPTION

A traditional yearbook provides information about the school and highlights events associated with a school within a given school year. The traditional yearbook does not adequately address each person's unique information and social interactions. Rather than providing a yearbook all about the school, customizable yearbooks are provided that include information specific to a student while the student attends the school.

Embodiments allow students to customize yearbooks by adding information specific to the student, for example, pictures taken by the student during the year, activities performed by the student during the year, and so on. The description herein refers to users of the yearbook customization system as a user or a student interchangeably. Although a printed yearbook allows a reader to view images and text, conventional printed yearbooks do not allow users to view or listen to media content, for example, video or audio content. Embodiments allow students to upload videos or audio files for customizing the student's yearbook. Embodiments also allow students to include a collection of images in the yearbook as a video presentation showing the images as a slide show. Media objects included in yearbooks may be associated with social interactions. For example a student may receive a video or audio message from another student for including in the student's yearbook. Embodiments allow students to include media objects in yearbooks. The yearbook is printed as a hard copy and includes a video presentation device. The video presentation device may be activated using buttons provided within pages of the yearbook. For example, a set of buttons may be provided such that a presentation of a video on the video presentation device is activated by pressing the corresponding button.

Overall System Environment

Figure 1:
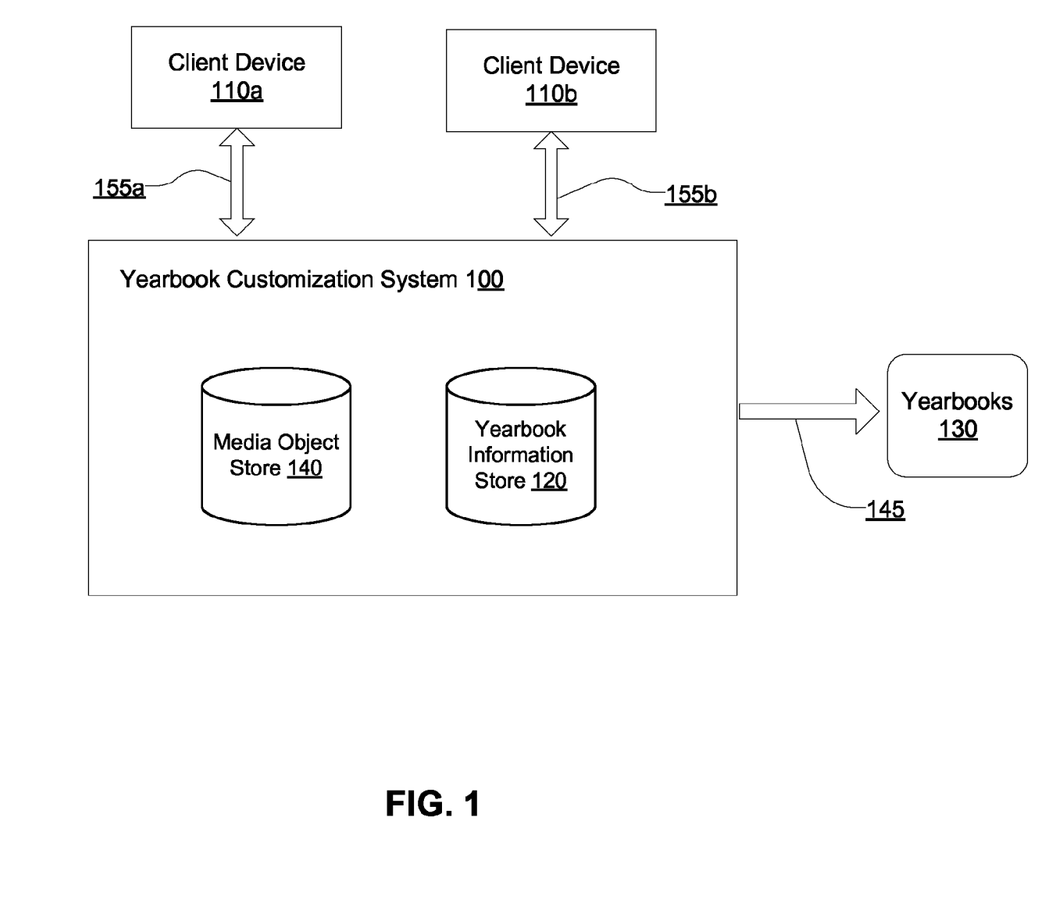
FIG. 1 illustrates the overall system environment for incorporating media objects in yearbooks, in accordance with an embodiment of the invention.

FIG. 1 illustrates the overall system environment for incorporating media objects in yearbooks, in accordance with an embodiment of the invention. The yearbook customization system 100 allows individuals to add information to the customized portions of the yearbook. A student may add customized pages to the yearbook that describe information specific to the student. Typically, customized yearbooks are unique to each student since they include information provided by the student that is unlikely to be included by other students. Furthermore, each student may design the layout for the customizable pages in a manner unique to the student. Systems and methods for allowing students to create personalized yearbooks by customizing individual pages are described in U.S. patent application Ser. No. 12/754,500, filed on Apr. 5, 2010, the contents of which are incorporated by reference herein.

FIG. 1 and the other figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*" and/or "110*b*" in the figures).

The yearbook customization system 100 allows a student to customize pages of the yearbook using information specific to the student. For example, the student can include information describing activities of the student during the year, images in which the student appears, or information sent by other students that is directed specifically to the student. These customized pages are unique to the yearbook of the student. Students often have media objects, for example, videos of events associated with their activities. For example, students often capture videos of events including student's concerts, parties, award ceremonies, or simply some fun activity. Conventional yearbooks do not provide any mechanism for students to include media objects in printed yearbooks. Media objects are often included in online systems. However, a typical yearbook experience of a person involves perusing a printed hardcopy of the yearbook.

There are certain portions of the yearbook that are common to several students, for example, to the entire school or to an entire grade. These include portrait pages, common images, and information describing the school that may be provided on the yearbook of all students of the school or all students of a particular grade. The pages that are common across multiple students are typically managed by a privileged user, for example, a system administrator. Embodiments allow a privileged user to incorporate media objects in the yearbook that are common across school. These may include some important presentation given by the dean or the principal of the school, some significant event that happened in the year, for example, a video of highlights of certain anniversary, and so on. Media objects may include videos as well as audios. For example, an audio may capture a lecture, a concert, or a song related to the school.

The different type of information associated with a student is combined to generate a customized yearbook for each student. The yearbook customization system 100 stores media objects uploaded by users in the media object store 140. The media objects uploaded by students may include video files, audio files, images, or text files. The yearbook customization system 100 stores information describing the yearbook as data structures encapsulated as yearbook objects. The yearbook object may store information describing the various portrait pages, metadata describing the yearbook, and so on. The information describing the yearbook is stored in the yearbook information store 120. The yearbook customization system 100 may deliver 145 the yearbooks to users as hard copies printed on paper. Embodiments allow incorporation of media objects in yearbooks provided as hard copies printed on paper. The printed copy includes a media presentation device that can present stored media objects. For example, the media presentation object can present videos.

Figure 2:
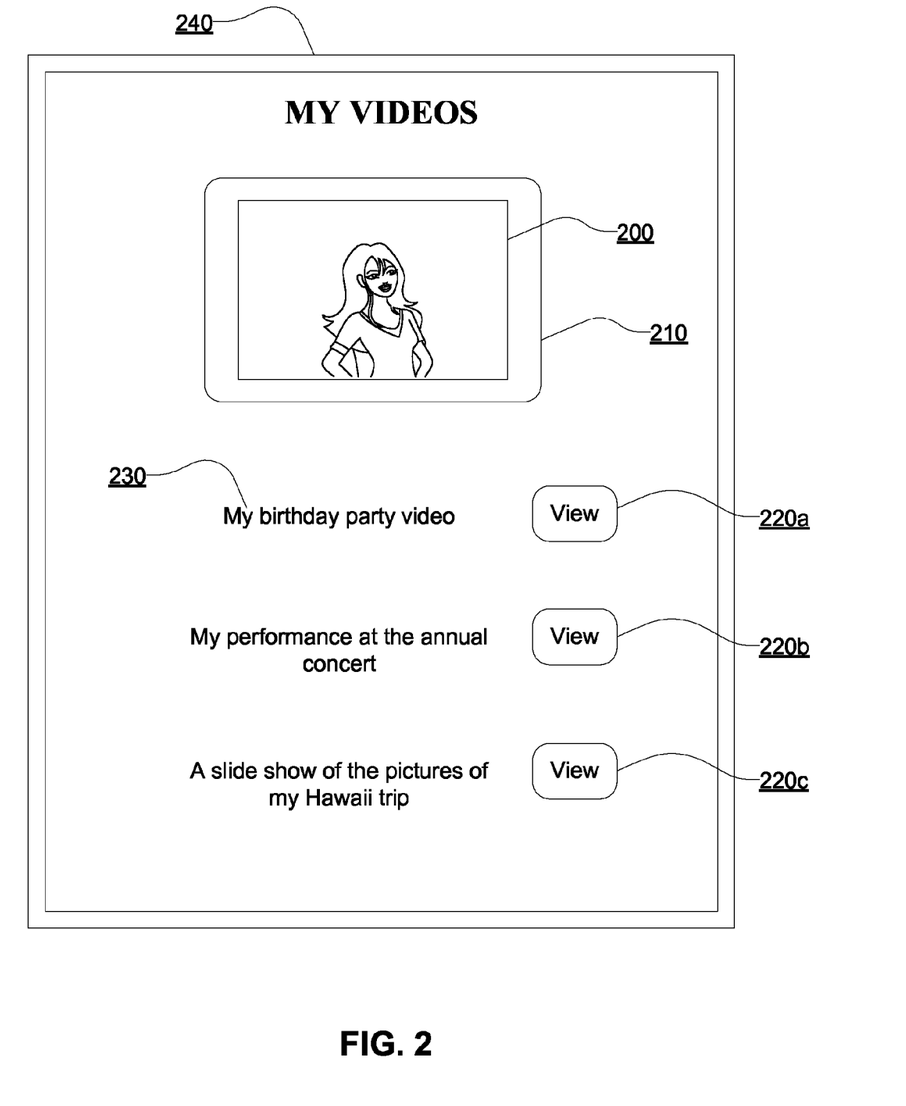
FIG. 2 shows a page of a printed yearbook allowing users to view videos, in accordance with an embodiment of the invention.

FIG. 2 shows a page of a printed yearbook allowing users to view videos, in accordance with an embodiment of the invention. The page 240 is a printed page of the yearbook. In an embodiment, the page 240 is a cover page of the yearbook, for example, the back cover. A video presentation device 200 is attached to the page 240. In an embodiment, the device 200 is configured to present other types of media objects, for example, audio objects. The video presentation device 200 is physically secured in the yearbook page 240 using a jacket 210. A user can customize the layout page 240 of the yearbook using a yearbook customization user interface 310 described herein. For example, a student may upload multiple videos and provide a description 230 of each video that is shown on the yearbook page 240.

The yearbook page 240 includes buttons 220 enclosed within the page 240. The yearbook page 240 provides visual indication of where the buttons are. Each button is configured to start a particular video using the video presentation device 200. For example, if a reader of the yearbook presses on the portion 220*a* of the page, a corresponding button is pressed causing the video presentation device to present a video associated with description "My birthday party video." Similarly if the reader presses on the portion 220*b* of the page, the user may be presented with a video associated with description "My performance at the annual concert" and if the reader presses on the portion 220*b* of the page, the user may be presented with a video associated with description "A slide show of the pictures of my Hawaii trip."

System Architecture

Figure 3:
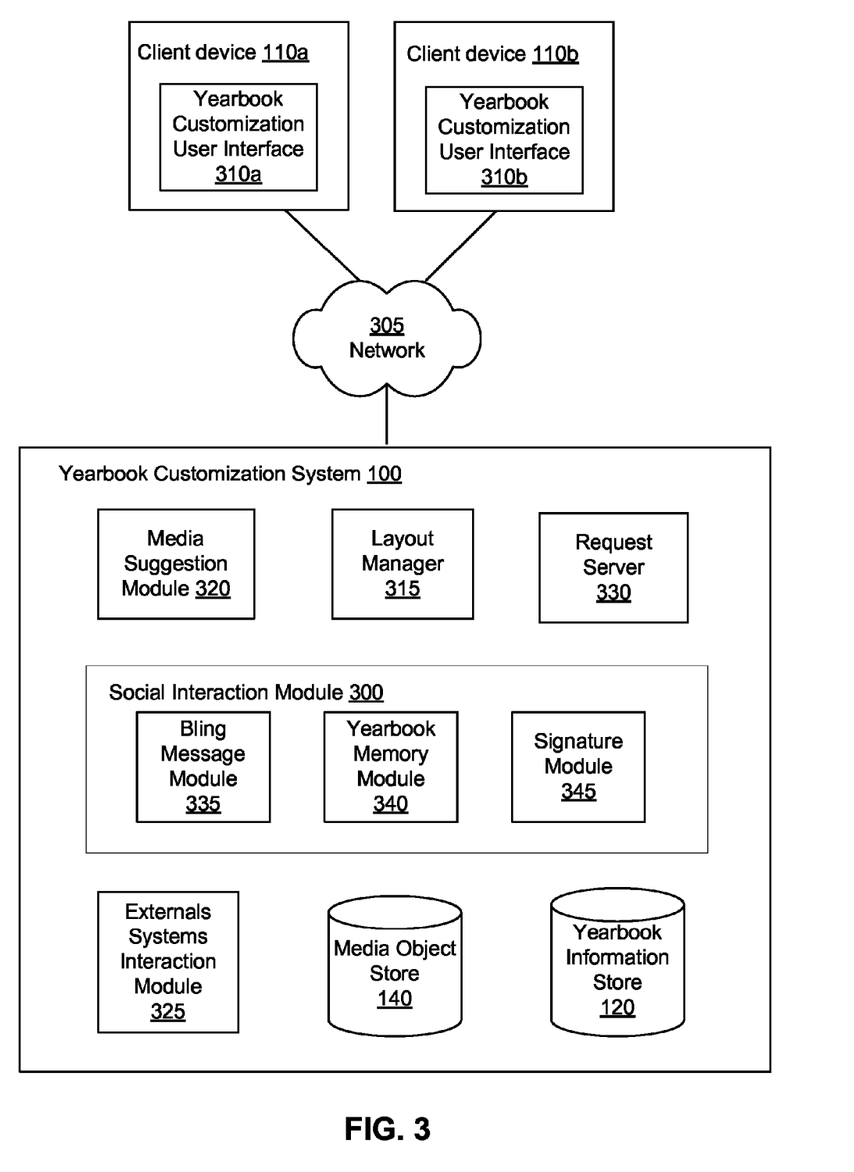
FIG. 3 illustrates the system architecture for customizing yearbooks using social interactions, in accordance with an embodiment of the invention.

FIG. 3 illustrates the system architecture for customizing yearbooks using social interactions, in accordance with an embodiment of the invention. A user interacts with the yearbook customization system 100 using a client device 110. Some embodiments of the systems 100 and 110 have different and/or other modules than the ones described herein, and the functions can be distributed among the modules in a different manner than described herein.

The client devices 110 comprise one or more computing devices that can receive member input and can transmit and receive data via the network 305. For example, the client devices 110 may be desktop computers, laptop computers, smart phones, personal digital assistants (PDAs), or any other device including computing functionality and data communication capabilities. The client devices 110 are configured to communicate via network 305, which may comprise any combination of local area and/or wide area networks, using both wired and wireless communication systems.

The client device 110 comprises a user interface 310 that can be used by a student to customize the student's yearbook. In one embodiment, the client device 110 and the yearbook customization systems 100 can be conventional computer systems executing, for example, a Microsoft Windows-compatible operating system (OS), Apple OS X, and/or a Linux distribution. A client device 110 can be a device having computer functionality, such as a personal digital assistant (PDA), mobile telephone, video game system, etc.

In one embodiment, the user interface 310 can be an internet browser application interacting with the yearbook customization system 100 that supports web applications for customizing yearbooks. In another embodiment, the user interface 310 can be a customized interface developed for an application supported by the yearbook customization system 100. Alternatively, the user interface 310 and the yearbook customization system 100 can be executed by the same computer system.

The user interface 310 allows users to create or edit pages for the yearbook by selecting the content to be included in the yearbook pages as well as specifying layout of the pages. For example, a user may use the user interface 310 to design the layout of customizable pages. The user interface 310 allows the user to upload documents as well as media objects, for example, videos, audio files, images, and so on from the client device 110 to the yearbook customization system 100. The user interface 310 allows a user to manually enter information to be incorporated in one or more yearbooks.

The yearbook customization system 100 includes a request server 330, a social interaction module 300, a layout manager 315, a media suggestion module 320, an external systems interaction module 325, and a yearbook information store 120. In other embodiments, the yearbook customization system 100 may include additional, fewer, or different modules for various applications. Conventional components such as network interfaces, security mechanisms, load balancers, failover servers, management and network operations consoles, and the like are not shown so as to not obscure the details of the system.

The request server 330 receives requests from client devices 110 or other external systems for processing by the yearbook customization system 100. In one embodiment, the request server 330 is a web server that processes web requests. The user interface 310 of the client device 110 can send requests to the request server 330 to receive information from the yearbook customization system 100. The request server 330 can also act as a web service providing application programming interfaces (APIs) to external systems to access information available in the yearbook customization system 100.

The layout manager 315 allows the user to specify the layout of pages of the yearbook. A student may use the layout manager 315 to design the layout of the pages that the students are allowed to customize. The yearbook information store 120 stores information describing the entire yearbook, for example, the cover page, information identifying the school, a grade for which the yearbook is designed, information describing pages customized by the students, and so on.

The media suggestion module 320 suggests media objects to users for inclusion in the yearbook. The media suggestion module 320 may select videos for inclusion in the video presentation device from various sources and suggest them to the user. The media suggestion module 320 may select videos previously uploaded by the user, videos uploaded by other users, images, and the like. In an embodiment, the media suggestion module 320 collects a set of images and presents them to the user. The user is suggested to make a slide presentation of the images for inclusion in the yearbook.

The media suggestion module 320 prioritizes content for suggesting to the user based on various factors. For example, if the user has accessed the video multiple times, the video may be given higher priority. Similarly the priority of a video or image suggested to the user increases based on the rate at which other users have accessed the video or image. The content prioritized high by the media suggestion module 320 may be suggested first to the user. Content prioritized low by the media suggestion module 320 may be presented at the end or not suggested to the user.

In an embodiment, the media suggestion module 320 suggests videos based on their size. Since the amount of storage available on the video presentation device is limited, the media suggestion module 320 may prioritize large video files lower than smaller video files. The media suggestion module 320 may also consider the amount of space available on the video presentation page for suggesting videos. For example, if there are a large number of candidate videos, the media suggestion module 320 may eliminate lower priority videos since there is only a limited amount of space available on the video presentation page of the yearbook for describing the videos.

The media suggestion module 320 may prioritize videos based on the time the videos were captured. The time of capture of a video may be determined based on metadata obtained from the video file or may be provided by the user when the user uploads the video. In an embodiment, the media suggestion module 320 associates videos with school events by comparing the time the video was captured with events of the school.

The events of the school may be obtained from a calendar of the school or provided by a system administrator. For example, if the video uploaded by a student was captured on or close to a date of graduation, or a day of a concert, or a day of a field trip, and the video is ranked higher for suggesting to the user. A video may be associated with an event even if the video was captured a few days (within a threshold) before or after an event. For example, a student may go to a graduation party a day after the graduation. A video captured during the party next day is associated with the graduation event. In an embodiment, the media suggestion module 320 prioritizes videos associated with school events, higher than videos not associated with school events.

In an embodiment, the yearbook customization system 100 receives a prioritization of school events. The prioritization of school events may be provided by a system administrator. For example, a graduation event may be determined to be higher priority than a concert, and the concert may be determined to be higher than a field trip. The priority of an event may be determined based on a measure of significance of each school event. The measure of significance of a school event is based on how important the event is considered by students. The measure of significance of each school event may be specified by an expert. The media suggestion module 320 may prioritize the videos based on the priority of event associated with the video.

In an embodiment, the media suggestion module 320 determines the importance of an event based on the number of videos associated with the event that are uploaded by students. In another embodiment, the media suggestion module 320 determines the importance of an event based on the number of videos associated with the event that are incorporated by students in their yearbooks.

The media suggestion module 320 may prioritize a video high if more than a threshold number of other videos captured close to the time of the video are uploaded to the yearbook customization system or incorporated in yearbooks by other students. For example, the media suggestion module 320 may not be able to associate the video with any school event or known activity. However, the media suggestion module 320 determines that videos captured at or close to the time this video was captured were considered significant by other students. For example, these videos may be associated with an event that may not be included in the school calendar or the event may not be a school event but still interesting for the students. This is so because the other students found videos captured at this time relevant for inclusion in the yearbook. Accordingly, there is high likelihood that the current student may also find the video relevant for the student's yearbook.

In an embodiment, the media suggestion module 320 performs clustering analysis of videos associated with various students. The media suggestion module 320 determines clusters of videos based on time of capture of videos. If there are more than a threshold number of videos captured within a particular time interval, that time interval is stored as a significant event. If a student video comes within a threshold of such a time interval, the video is preferred for suggesting to the student for inclusion in the yearbook.

In an embodiment, the media suggestion module 320 determines a score for each video for suggesting to the student. A video with a high score has a higher chance of being selected for suggesting to the student. Furthermore, the video with a higher score may be displayed more prominently to the student in a list of suggestions compared to lower ranked videos. For example, the videos may be ranked in an order based on their scores, where higher ranked videos appear first.

In an embodiment, the media suggestion module 320 prioritizes a video low if the video is determined to be older than the school year. In this embodiment, the yearbook customization system 100 obtains the dates of the school year from a system administrator or from a calendar of the school year. The media suggestion module 320 compares the date of the capture of the video with the date of beginning of the school year to determine if the video was captured before the school year.

Several of these criteria for prioritizing videos are significant if the yearbook customization system 100 accesses external social networking systems for identifying media objects for suggesting to students. An external social networking system may include media objects of all types of events that may or may not be relevant to school events. The prioritization of the media suggestion module 320 is based on the fact that students typically prefer to include content relevant to school events in a yearbook.

In an embodiment, the media suggestion module 320 may perform transformations on the media objects to reduce the amount of storage required by the media objects. For example, the media suggestion module 320 may reduce the resolution of a video to match the resolution of the video presentation device.

In an embodiment, the media suggestion module 320 prioritizes videos provided by other users based on a measure of closeness of relationship between the user and the other user. For example, if the user and the other user frequently interact with each other, a video provided by the other student is given higher priority. A video provided by another user determined to be family may be prioritized higher than a video provided by a friend. Information describing types of relationship and measures of closeness between two users may be obtained from social networking system or may be determined based on interactions between the users within the yearbook customization system 100.

In some embodiments, the yearbook customization system 100 includes an external systems interaction module 325 that allows the yearbook customization system 100 to interact with external systems, for example, social networking systems. For example, the yearbook customization system 100 may invoke application programming interface (APIs) of a social networking system to retrieve social information describing a user or social interactions between two users. The information retrieved from the social networking system may be used to making various determinations related to including information in yearbooks as described herein.

The social interaction module 300 allows users of the yearbook customization system 100 to interact 155 with each other via the yearbook customization system 100. The social interaction module 300 may be used by a source student to provide information to a target student for inclusion in the target student's yearbook. For example, a student may send a one-on-one message to another student for including in the other student's yearbook. A student may provide media objects for inclusion in the other students yearbook. For example, a student may capture a video and send for inclusion in the other student's yearbook. The social interaction module 300 comprises other modules including a bling message module 335, a yearbook memory module 340, a signature module 345, and a social interaction store 250.

The bling message module 335 allows a user to send preconfigured messages provided by the yearbook customization system 100 to other students. The yearbook memory module 340 allows a user to add memories to the customizable pages of the yearbook. The signature module 345 allows a user to add a signature comprising a text message and/or an image to another user's yearbook. The social interaction store 250 stores information describing the social interactions of a user. The various sub-modules of the social interaction module 300 are further described in detail herein.

The network 305 enables communications between the computer systems including the yearbook customization system 100, client devices 110, or other external systems. In one embodiment, the network 305 uses standard communications technologies and/or protocols. In another embodiment, the entities can use custom and/or dedicated data communications technologies instead of, or in addition to, the ones described above. Depending upon the embodiment, the network 305 can also include links to other networks such as the Internet.

Overall Process of Incorporating Media Objects in a Yearbook

Figure 4:
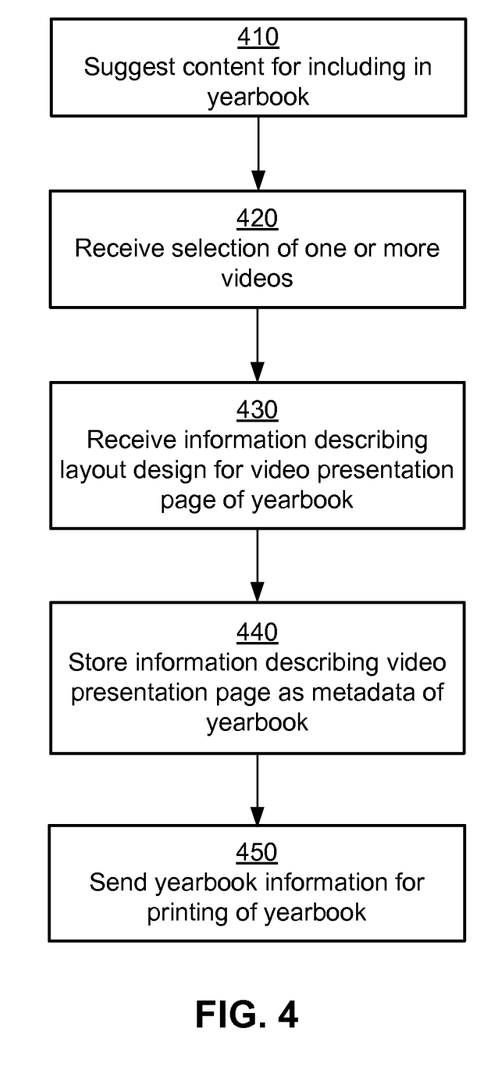
FIG. 4 illustrates the overall process of incorporating media objects in a yearbook, in accordance with an embodiment of the invention.

FIG. 4 illustrates the overall process of incorporating media objects in a yearbook, in accordance with an embodiment of the invention. The media suggestion module 320 suggests videos or other type of content for inclusion in the video presentation device of the yearbook. The media suggestion module 320 receives 420 selections of videos from the user for inclusion in the yearbook. The selection of videos or media objects may be from the media objects suggested by the media suggestion module 320 or other media objects. The user may upload new content for inclusion in the yearbook. In an embodiment, a student may have an account in the yearbook customization system 100. The student may upload media objects using the student account. The media objects uploaded by the student are stored with the student account.

The layout manager 315 allows the user to provide information describing the layout of the video presentation page of the yearbook. In some embodiments there may be multiple video presentation pages in the yearbook. The layout manager 315 allows the user to design the layout of each of these video presentation pages. The layout information for a video presentation page includes the position of the video presentation device 200 within the video presentation page, the presentation and content of the text 230 describing each video selected for presentation, the icon, position, and size of the button used for selecting each video and so on. The layout manager stores the information describing the videos and the layout of the video presentation page as part of the yearbook metadata stored in the yearbook information store 120. In an embodiment, the yearbook customization system 100 compares the total size of all the videos selected for presentation using the video presentation page with the storage capacity of the video presentation device to make sure that the video presentation device has sufficient capacity to store the videos. If the video presentation device doesn't have sufficient capacity, the yearbook customization system 100 may request the user to delete or change some of the videos to reduce the total size of the videos.

The yearbook customization system 100 sends the yearbook metadata for printing a hardcopy of the yearbook. The yearbook customization system 100 also sends the content of the media objects selected for inclusion in the video presentation device. In an embodiment, the media objects may be copied to a persistent storage device, for example, a CD (compact disk), a DVD (digital video disk), or a flash drive for sending for inclusion in the video presentation device. The configuration of the video presentation device and printing of the yearbook as well as inclusion of the video configuration device may be performed by third party vendors.

Social Interactions as a Source of Media Objects

Figure 5:
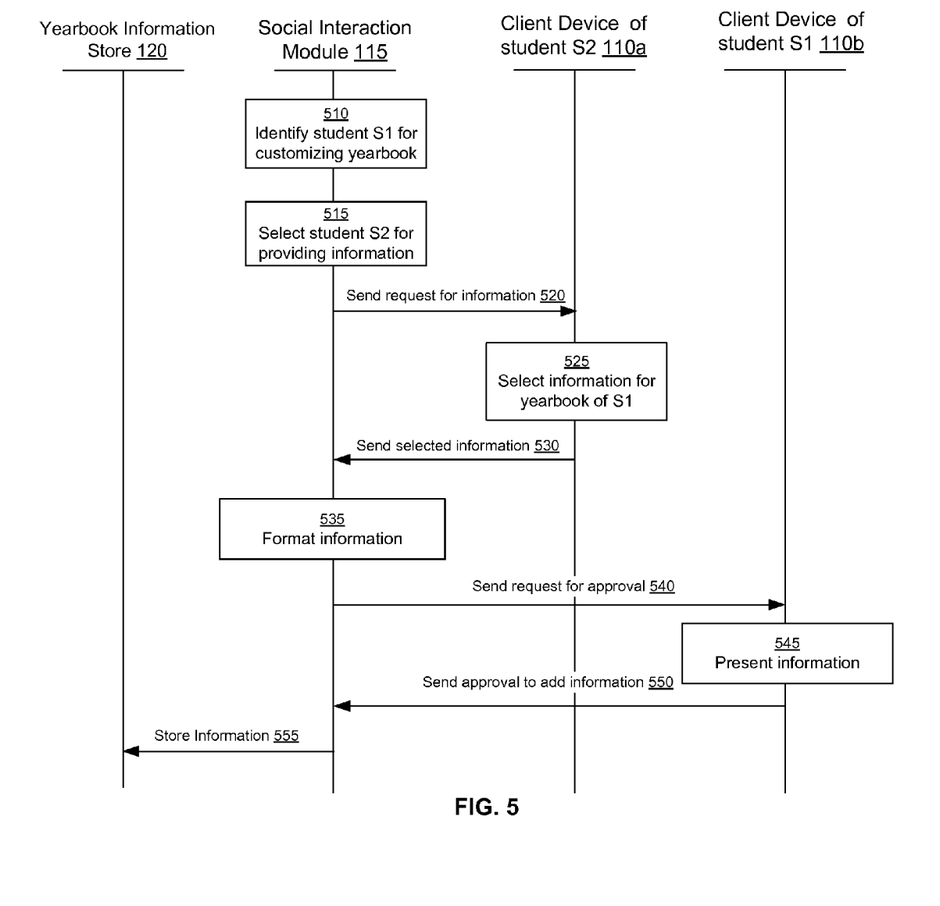
FIG. 5 is an interaction diagram illustrating the overall process of customizing a student's yearbook pages using social interactions, in accordance with an embodiment of the invention.

FIG. 5 is an interaction diagram illustrating the overall process of customizing a student's yearbook pages using social interactions, in accordance with an embodiment of the invention. As illustrated in FIG. 5, the yearbook customization system 100 helps student S1 customize the student's yearbook using messages sent by student S2 to S1. The messages sent by student S2 may include media objects that may be selected by student S1 for including in S1's yearbook. Other embodiments can perform different and/or additional steps. Moreover, other embodiments can perform the steps in different orders. Furthermore, some, or all of the steps can be performed by entities other than the modules described.

The social interaction module 300 identifies 510 a student S1 for customizing the yearbook of the student. In an embodiment, the student S1 is selected responsive to the other student S2 making a request to add information to the yearbook of student S1. Alternatively, the social interaction module 300 may identify 510 a student S1 that has not customized the student's yearbook for more than a threshold amount of time. For example, if student S1 has not customized the student's yearbook for several months, the social interaction module 300 initiates the process illustrated in FIG. 5 to ensure that the student S1 receives information to add to the yearbook. The social interaction module 300 initiates the process to customize the student's yearbook by sending requests to other students to provide information for adding to student S1's yearbook. This provides incentive to student S1 to customize the student's yearbook.

The social interaction module 300 selects 515 another student S2 for providing information for customizing student S1's yearbook. The social interaction module 300 may use various criteria for selecting 515 the other student. In an embodiment, the student S2 initiates the process of providing additional information for customizing yearbook of student S1.

In some embodiments, the social interaction module 300 selects 515 the other student S2 based on criteria including whether students S1 and S2 have a relation in the school. The students S1 and S2 may have a relation in the school if they are part of the same student group. A student group may be a grade, a section, a club, for example, sports club of the school, a committee of the school and so on. The students S1 and S2 may have a relation in the school if they have a common teacher. In some embodiments, the social interaction module 300 determines relations between S1 and S2 based on background information or historical information describing the students, for example, whether S1 and S2 shared other schools previously.

In some embodiments, the social interaction module 300 determines relations between S1 and S2 based on whether students S1 and S2 have social interactions with each other, for example, via a social networking system. The social interaction module 300 may also select 515 other student S2 if S1 and S2 had previous interactions within the yearbook customization system 100. As an example, if S1 previously provided information for S2's yearbook, S2 may be selected for providing information for S1's yearbook. The social interaction module 300 may also select 515 student S2 if S1 has added information describing S2 in S1's yearbook. For example, if S1 has selected a photo of S2 and added to S1's yearbook, the social interaction module 300 may prompt S2 to send a message to S1 for including in S1's yearbook.

In an embodiment, the social interaction module 300 interacts with external systems, for example, social networking systems to determine how close students S1 and S2 are. A social networking system may provide a measure of closeness of two users of the social networking system. Alternatively, the social interaction module 300 may invoke application programming interface (API) of a social networking system to request information describing how often S1 and S2 interact with each other, the types of interactions between S1 and S2, whether S1 and S2 have been tagged together in the same photo, whether S1 and S2 visited a location together, and so on. The social interaction module 300 receives such information from a social networking system to select 515 other students for providing information to customize student S1's yearbook.

The social interaction module 300 sends 520 a request for information to the other student S2. The social interaction module 300 may send 520 a message to S2 asking S2 whether S2 would like to provide information for S1's yearbook. For example, a message may be displayed on the yearbook customization user interface 510 displayed to the client device 110 of student S2 when the student S2 logs into the yearbook customization system 100.

The social interaction module 300 may prompt the student S2 with different types of questions or hints helping the student S2 narrow down the type of information that S2 can provide for S1's yearbook. In an embodiment, the questions and hints presented to S2 are based on past history of interactions between S1 and S2. For example, if S1 and S2 are determined to be members of a sports club, the social interaction module 300 may send a question to S2 asking if S2 would like to provide any sports related information for S1's yearbook. The student S2 may decide to send a message to S1 congratulating S1 for some sports related achievement. The message provided by S2 may be included by S1 in S1's yearbook.

The student S2 selects 525 information for adding to S1's yearbook, for example, by answering questions presented to S2 by the social interaction module 300. The student S2 may type in textual information or upload media objects including photos, audio, or video for possible inclusion in student S1's yearbook. For example, students S1 and S2 may have attended an event together and S2 may have captured photos or videos of the event that S2 may not have previously sent to S1.

The student S2 provides the selected information to the student S1 using the social interaction module 300. For example, the client device 110a of student S1 sends 530 the selected information to the social interaction module 300. The social interaction module 300 may format 535 the information for including in the yearbook, for example, the social interaction module 300 may add an image associated with student S1 or name of student S1 to the information. The social interaction module 300 sends 540 a request for approval of student S1 to the client device 110b of student S1.

The yearbook customization user interface 510 on the client device 110b presents 545 the formatted information received from the social interaction module 300. The student S2 may review the information presented 545 to determine whether the information should be included in the student S2's yearbook. If the student S2 decides to include the information in the yearbook, the student S2 sends 550 an approval to the social interaction module 300 to include the information in the yearbook. The social interaction module 300 sends the formatted information for storing 555 in the yearbook information store 120. The formatted information may ultimately be incorporated in S1's yearbook, for example, the information may be printed on a customized page of the yearbook when S1's yearbook is printed.

Preconfigured Messages for Other Student's Yearbooks

In an embodiment, the social interaction module 300 provides pre-configured messages to a student for sending to other students for inclusion in their yearbooks. The pre-configured messages simplify the task of a student since the student does not have to spend significant effort in coming up with a message to send. This increases student participation in terms of sending information for inclusion in other student's yearbooks.

The pre-configured messages are referred to herein as bling messages. The common meaning of the term bling refers to jewelry. The term bling message refers to messages received by a student that are included in the yearbook. A yearbook is used by people to show their memories akin to jewelry used by people to show their wealth. Accordingly, these messages included in the yearbook are referred to as bling messages.

Figure 6:
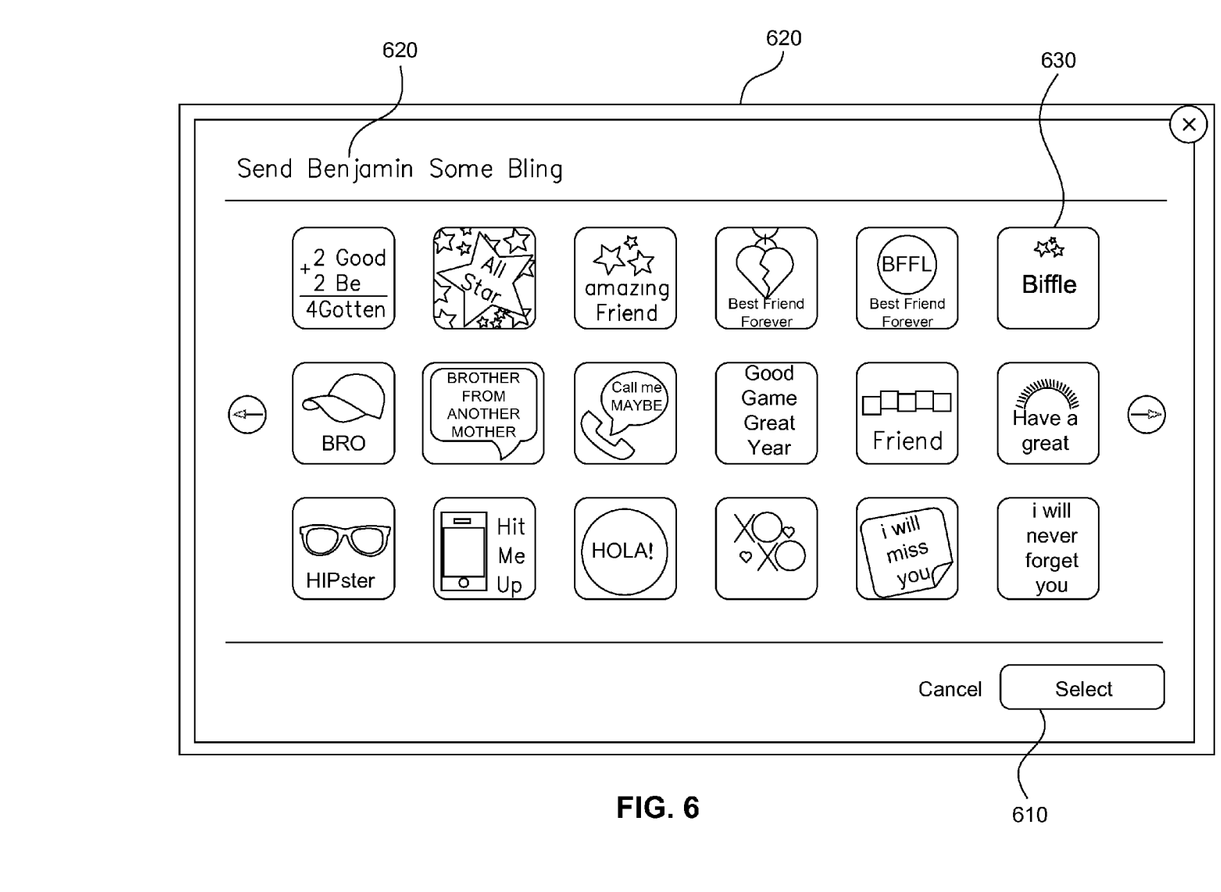
FIG. 6 is a screenshot of a user interface presenting a student with bling messages comprising images and text for sending to other students for including in the other student's yearbook, in accordance with an embodiment of the invention.

FIG. 6 is a screenshot of a user interface 600 presenting a student with bling messages comprising images associated with messages for sending to other students for including in the other student's yearbook, in accordance with an embodiment of the invention. In an embodiment, the user interface 600 is presented to student S2, requesting S2 to send a bling message to student S1. The user interface 600 presents information identifying student S1. The user interface 600 allows the user to send one or more bling messages by selecting the bling messages and clicking on a button 610.

A bling message may include an icon 630 comprising an image. A bling message is associated with a message that may be implicit in the icon, for example, a heart symbol or a star symbol. A bling message may include text that conveys a particular message, for example, "hugs and kisses," "I will miss you," "best friends forever," and the like. In some embodiments, the bling message includes a preconfigured media object, for example, a video or sound with a message. The student receiving the bling message may include the media objects received in the bling messages in the yearbook.

Signing Other Student's Yearbooks

Figure 7:
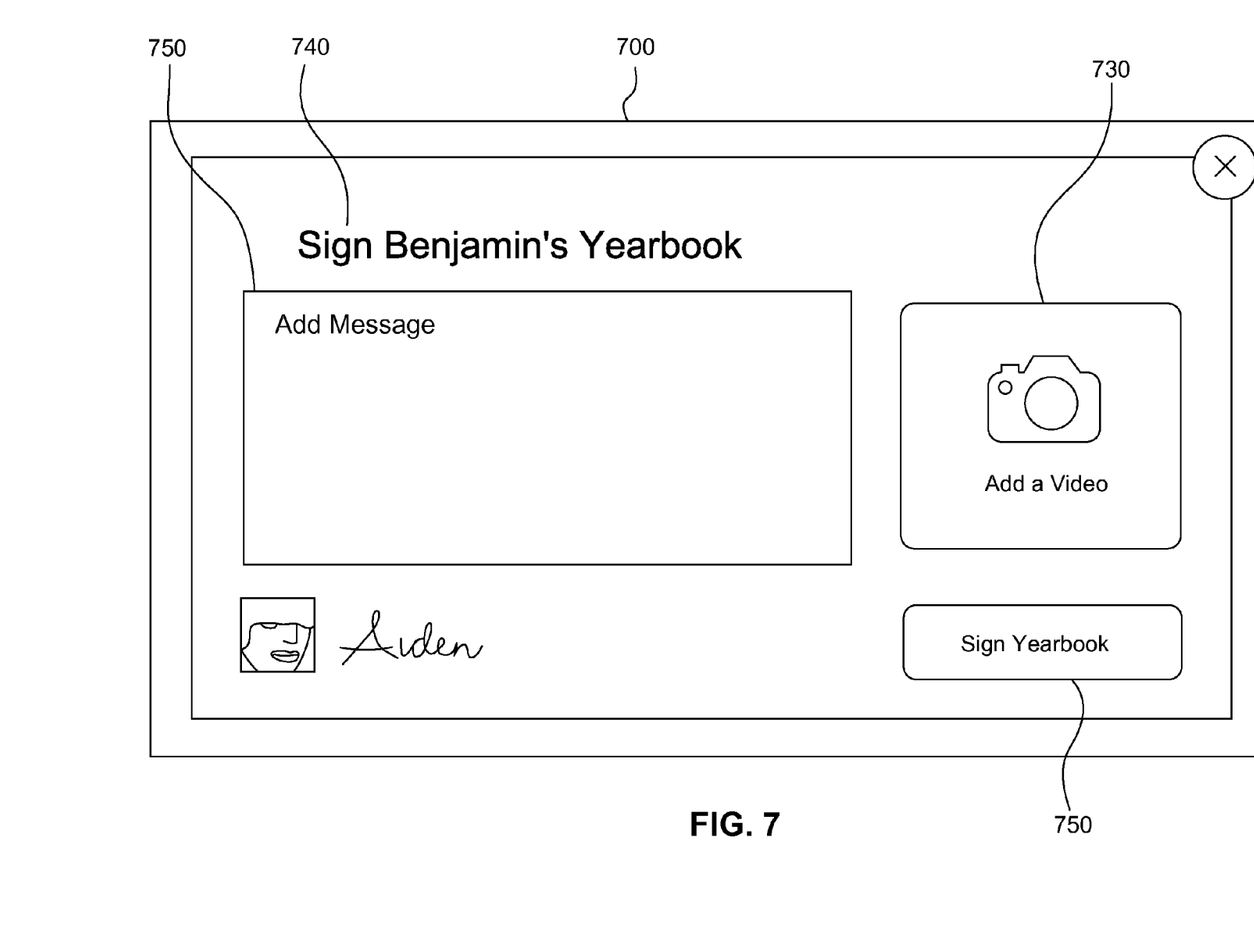
FIG. 7 is a screenshot of a user interface allowing a student to provide a signature for including in another student's yearbook, in accordance with an embodiment of the invention.

FIG. 7 is a screenshot of a user interface 700 allowing a student to sign another student's yearbook, in accordance with an embodiment of the invention. In an embodiment a student requests the yearbook customization system 100 to sign another student's yearbook. In other embodiments, the yearbook customization system 100 selects a target student and sends messages to other students requesting them to sign the target student's yearbook. For example, the yearbook customization system 100 may select a student with less than a threshold amount of content in the customizable pages.

A student invokes the user interface 700 to sign another student's yearbook. The user interface 700 provides information identifying the student whose yearbook is being signed. The user interface 700 allows the student to upload 730 a media object including a video, audio, or image for including in the yearbook along with the signature. The user interface 700 also allows the student to add 750 a text message. The student sends the signature to the other student by clicking on the button 760.

The signature is received by the student whose yearbook is being signed. The student receiving the signatures may determine where the signatures are placed in the yearbook. The signatures may be placed within the customized pages of the yearbook by the student. The student may decide to include the media objects received from the other student in the student's yearbook.

Yearbook Memories

The yearbook memory module 340 allows students to add memories of the school year to the yearbook. For example, a student may have participated in certain school event, received certain award, gone on a trip, made new friends, and so on. In an embodiment, the yearbook customization system 100 prompts the student with preconfigured questions to help student remember the activities of the year. For example, a student may not remember all the activities of the year when customizing the yearbook. In an embodiment, the yearbook customization system prompts the student with information that is likely to be an interesting memory for the student based on social information of the student.

Figure 8:
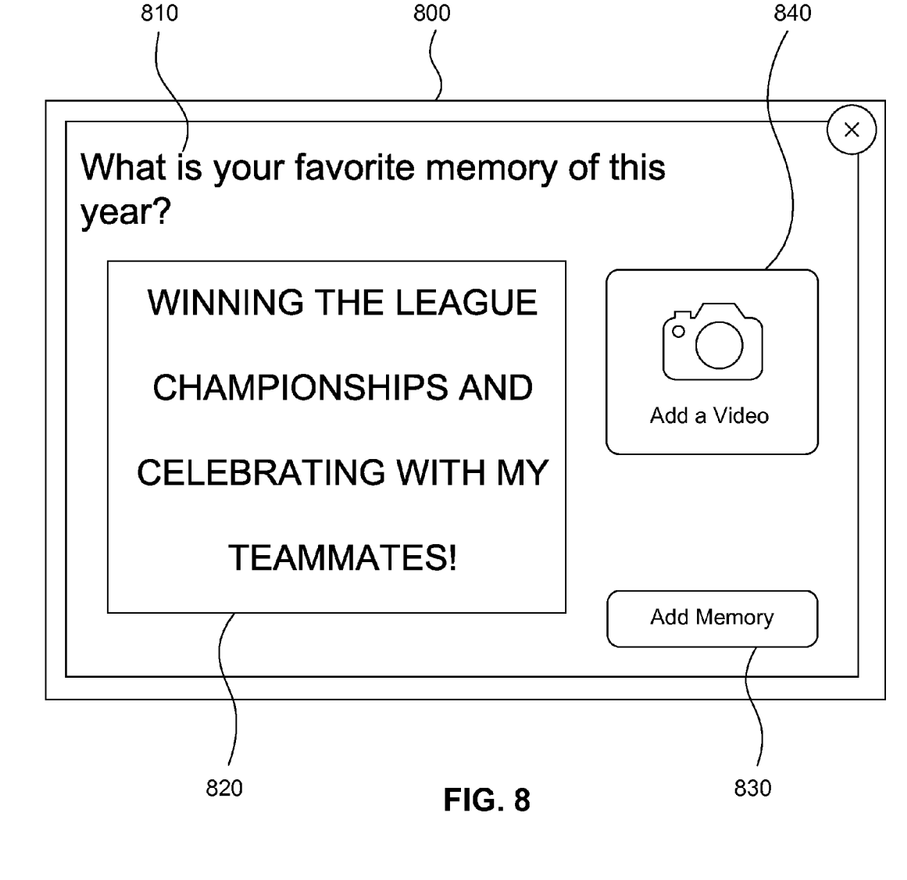
FIG. 8 is a screenshot of a user interface prompting a student to add a yearbook memory to the student's yearbook, in accordance with an embodiment of the invention.

FIG. 8 is a screenshot of a user interface 800 prompting a student to add a yearbook memory to the student's yearbook, in accordance with an embodiment of the invention. The user interface 800 prompts the student with a question 810 or a request guiding the student with the type of memory. For example, the question 810 can ask student about the favorite sports activity, or the favorite holiday, or the favorite trip.

The user interface 800 provides widgets 840 that allow the student to upload a media object including a video, audio, or image associated with the memory. For example, if the student went on a trip, the student can upload a video captured during the trip. As another example, if the student attended an event, for example, a birthday party the student can upload videos captured during the birthday party. The user interface 800 also allows the student to enter text 820 describing the memory. The user interface 800 provides a link or button 830 that allows the student to submit the memory to the yearbook.

The yearbook customization system 100 allows students to share media objects of the student with others. A student can provide a privacy setting for a media object specifying the other users with whom the student wants to share the media object with. The privacy setting may specify whether the media object can be shared with the entire school, the student's grade, the student's section, or a select few friends of the student enumerated by the student. Sharing of a media object allows other students to access the media object. A student can include a media object shared by another student in the student's yearbook. For example, a student may share a video of a trip on which few students went together. The other students who also went on the trip may include the video in their yearbooks.

Computer Architecture

Figure 9:
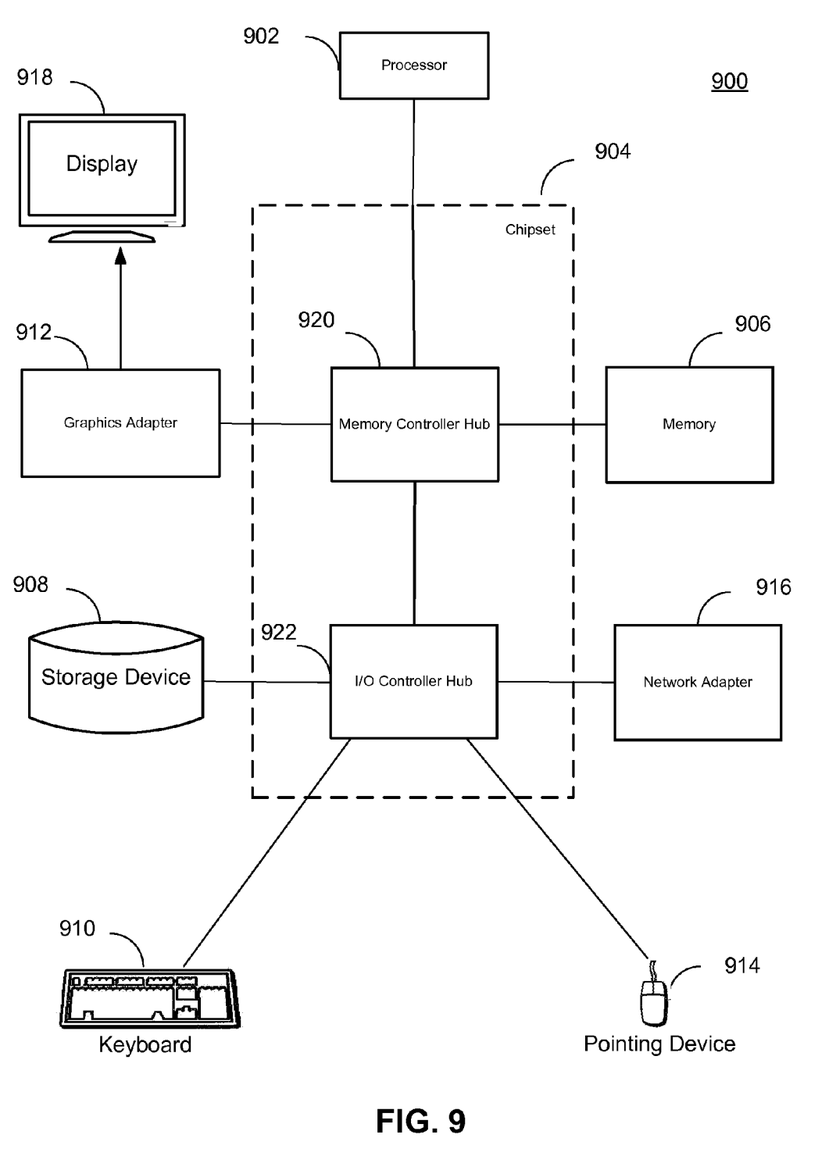
FIG. 9 is a high-level block diagram illustrating an example of a computer for use in a computing environment for customizing yearbooks according to one embodiment of the present disclosure.

FIG. 9 is a high-level block diagram illustrating an example computer 200 used for customizing a yearbook for individual students in an educational organization in accordance with an embodiment of the invention. The computer 900 includes at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, keyboard 910, pointing device 914, and network adapter 916 are coupled to the I/O controller hub 922. Other embodiments of the computer 900 have different architectures.

The storage device 908 is a non-transitory computer-readable storage medium such as a hard drive, compact disk read-only memory (CD-ROM), DVD, or a solid-state memory device. The memory 906 holds instructions and data used by the processor 902. The pointing device 914 is a mouse, track ball, or other type of pointing device, and is used in combination with the keyboard 910 to input data into the computer system 900. The graphics adapter 912 displays images and other information on the display 918. The network adapter 916 couples the computer system 900 to one or more computer networks.

The computer 900 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 908, loaded into the memory 906, and executed by the processor 902.

The types of computers 900 used in a yearbook customization system can vary depending upon the embodiment and requirements. For example, a computer system used as a server might include one or more blade computers lacking displays, keyboards, and/or other devices shown in FIG. 9. Likewise, a computer system used as a client device might comprise a mobile phone or other such device with a touch-sensitive display and limited processing power.

Alternative Applications

Embodiments allow the creation of personalized yearbooks for students of elementary schools, middle schools, high schools, colleges but can be extended to other organizations or social groups, for example, youth sports team books (soccer team, etc.), youth clubs (boy scouts, etc.), military groups, vacation and travel groups (cruise boat) and the like. Any organization or club may publish a yearbook describing events and activities of the organization. Furthermore, the events and interactions described in the book are not limited to a year. For example, techniques apply to books that are published once in two years or twice a year, or published only once. However, the description herein refers to the books as yearbooks and to the people contributing to the yearbook as students.

Accordingly, as described herein, a yearbook may refer to a yearbook for a school year customized by a student or a yearbook may refer to any book that includes information describing an organization or a social group that is customized by individuals that are members of the organization of social group. Although techniques described herein are illustrated using yearbooks that are typically published as a printed copy, these techniques are applicable to other mechanisms of delivering yearbooks, for example, digitally delivered yearbooks and yearbooks where a student connects to an online system to view the yearbook content. Furthermore, although techniques described herein refer to students customizing yearbooks, the techniques apply to any user customizing yearbook, for example, an employee customizing a yearbook published by an employer.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method performed by a computer processor for incorporating media objects in a yearbook, the method comprising:

maintaining, by a computer system, information describing customizable yearbooks for students of a school;

receiving one or more videos for including in a printed hard copy of a customizable yearbook of a student, wherein the one or more videos are for presenting via a video presentation device physically attached to the printed hard copy of the customizable yearbook, the video presentation device comprising a display screen for presenting videos;

receiving information describing layouts of one or more video presentation pages of the customizable yearbook, the layouts specifying:

for each of the one or more videos, a position of a button for activating presentation of the video via the video presentation device, and a position in a video presentation page for physically attaching the video presentation device in a printed hard copy of the yearbook;

selecting videos for suggesting to the student for including in the video presentation page of the yearbook, wherein selecting videos for suggesting to the students comprises:

determining a time of capture of videos associated with the student;

receiving information of timing of a current school year; and preferring videos captured within the current school year over videos captured before the current school year started;

sending information describing the selected videos as suggestions for including in the video presentation page of the yearbook; and sending information describing the customizable yearbook for printing one or more hard copies of the customizable yearbook, wherein each printed hard copy of the customizable yearbook comprises the one or more video presentation pages and a video presentation device physically attached to a video presentation page.

2. The computer implemented method of claim 1, wherein selecting videos for suggestion comprises:

receiving information describing timings of school events; and associating a video with a school event based on the time of capture of the video being within a threshold time interval of a school event.

3. The method of claim 1, further comprising:

preferring videos captured within a threshold time interval of a school event over other videos.

4. The method of claim 1, further comprising:

ranking videos for suggesting to the student based on a measure of significance of a school event associated with each video.

5. The method of claim 1, wherein selecting videos for suggesting to the student further comprises:

selecting videos received by the student in messages from other students; and ranking each video received by the student in a message from another student based on a measure of closeness between the student and the other student.

6. The method of claim 1, wherein selecting videos for suggesting to the student further comprises:

preferring videos having smaller size over larger videos.

7. The method of claim 1, wherein selecting videos for suggesting to the student further comprises:

identifying a set of images associated with an account of the student; and suggesting the set of images for including in the yearbook as a slide show.

8. The method of claim 1, wherein selecting videos for suggesting to the student further comprises:

identifying a set of images associated with an account of the student; and suggesting the set of images for including in the yearbook as a slide show.

9. The method of claim 1, further comprising:

comparing a sum of sizes of the videos selected for including in the yearbook with a storage capacity of the video presentation device.

10. The method of claim 1, wherein the one or more videos comprise a video uploaded using an account of the student.

11. The method of claim 1, wherein the one or more videos comprise a video received in a message sent to the student by another student.

12. The method of claim 1, wherein the one or more videos comprise a video displaying a set of images as a slide presentation.

13. A non-transitory computer-readable storage medium storing computer-executable code for allowing students to customize a yearbook, the code when executed by a processor, causing the processor to:

maintain information describing customizable yearbooks for students of a school;

receive one or more videos for including in a printed hard copy of a customizable yearbook of a student, wherein the one or more videos are for presenting via a video presentation device physically attached to the printed hard copy of the customizable yearbook, the video presentation device comprising a display screen for presenting videos;

receive information describing layouts of one or more video presentation pages of the customizable yearbook, the layouts comprising:

for each of the one or more videos a position of a bun for activating presentation of the video via the video presentation device, and a position in a video presentation page for physically attaching the video presentation device to a printed hard copy of the yearbook;

select videos for suggesting to the student for including in the video presentation page of the yearbook, wherein the code for selecting videos for suggesting to the students causes the processor to:

determine a time of capture of videos associated with the student;

receive information of timing of a current school year; and prefer videos captured within the current school year over videos captured before the current school year started;

send information describing the selected videos as suggestions for including in the video presentation page of the yearbook; and send information describing the customizable yearbook for printing one or more hard copies of the customizable yearbook, wherein each printed hard copy of the customizable yearbook comprises the one or more video presentation pages and a video presentation device physically attached to a video presentation page.

14. The non-transitory computer-readable storage medium of claim 13, wherein the code for selecting videos for suggesting to the students causes the processor to:

receive information describing timings of school events; and associate a video with a school event based on the time of capture of the video being within a threshold time interval of a school event.

15. The non-transitory computer-readable storage medium of claim 13, wherein the code for selecting videos for suggesting to the students causes the processor to:
- select videos received by the student in messages from other students; and
- rank each video received by the student in a message from another student based on a measure of closeness between the student and the other student.

16. A computer-implemented system for allowing students to customize a yearbook, the system comprising:
- a computer processor; and
- a non-transitory computer-readable storage medium storing computer-executable code for allowing students to customize a yearbook, the code when executed by a processor, causing the processor to:
  - maintain information describing customizable yearbooks for students of a school;
  - receive one or more videos for including in a printed hard copy of a customizable yearbook of a student, wherein the one or more videos are for presenting via a video presentation device physically attached to the printed hard copy of the customizable yearbook, the video presentation device comprising a display screen for presenting videos;
  - receive information describing layouts of one or more video presentation pages of the customizable yearbook, the layouts comprising:
    - for each of the one or more videos a position of a button for activating presentation of the video via the video presentation device, and
    - a position in a video presentation page for physically attaching the video presentation device to a printed hard copy of the yearbook;
  - select videos for suggesting to the student for including in the video presentation page of the yearbook, wherein the code for selecting videos for suggesting to the students causes the processor to:
    - determine a time of capture of videos associated with the student;
    - receive information of timing of a current school year; and
    - prefer videos captured within the current school year over videos captured before the current school year started;
  - send information describing the selected videos as suggestions for including in the video presentation page of the yearbook; and
  - send information describing the customizable yearbook for printing one or more hard copies of the customizable yearbook, wherein each printed hard copy of the customizable yearbook comprises the one or more video presentation pages and a video presentation device physically attached to a video presentation page.

17. The computer-implemented system of claim 16, wherein the code for selecting videos for suggesting causes the processor to:
- receive information describing timings of school events; and
- associate a video with a school event based on the time of capture of the video being within a threshold time interval of a school event.

18. The computer-implemented system of claim 16, wherein the code for selecting videos for suggesting causes the processor to:
- select videos received by the student in messages from other students; and
- rank each video received by the student in a message from another student based on a measure of closeness between the student and the other student.

* * * * *